Jan. 3, 1939. A. B. BROLUSKA 2,142,173
AUTOMATIC EQUALIZING FLEXIBLE STABILIZER FOR SAFETY BODIES
Filed May 7, 1937 8 Sheets-Sheet 1
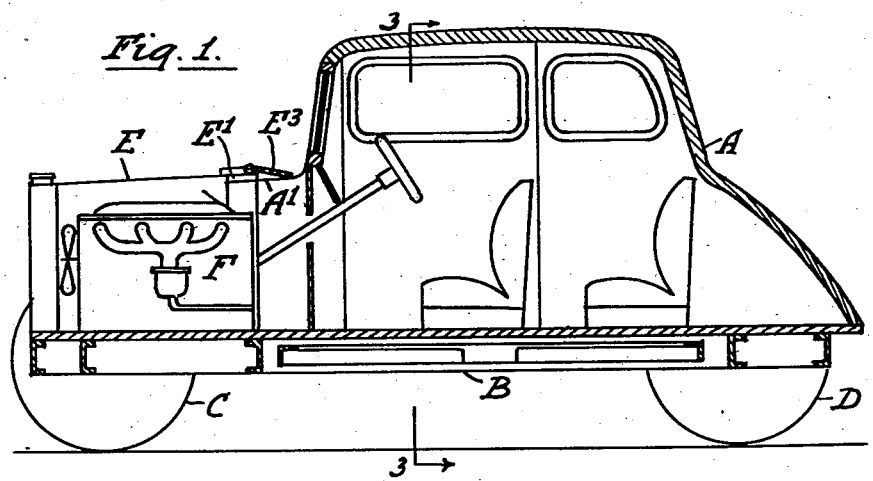
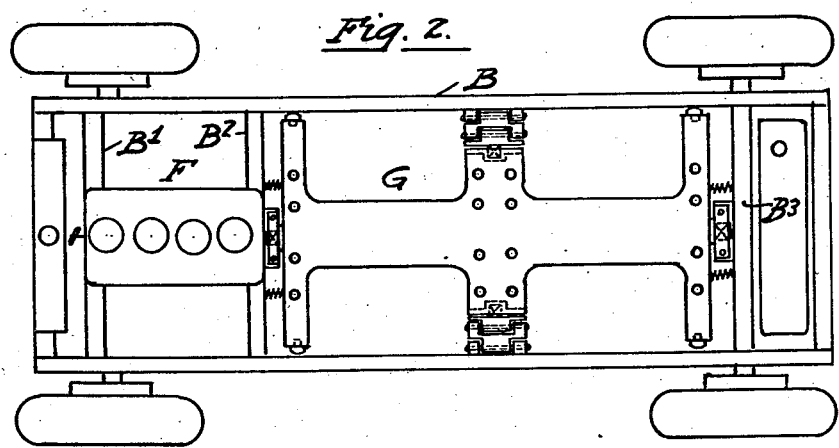
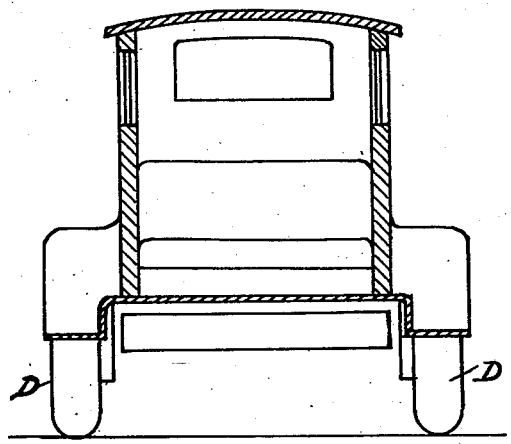
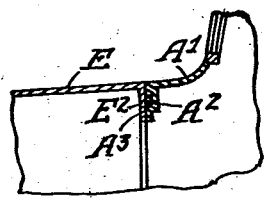
Inventor—
Amel B. Broluska

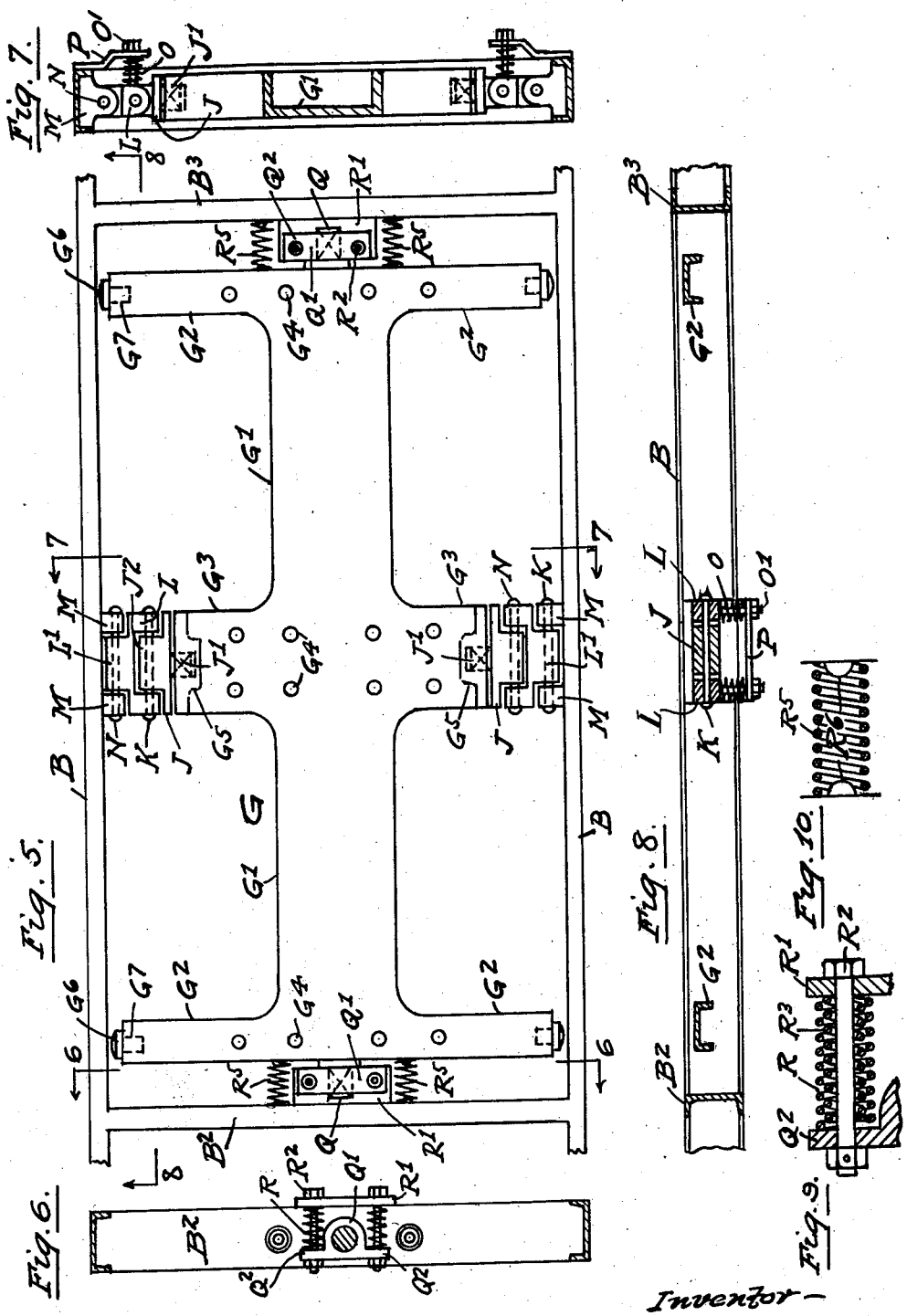

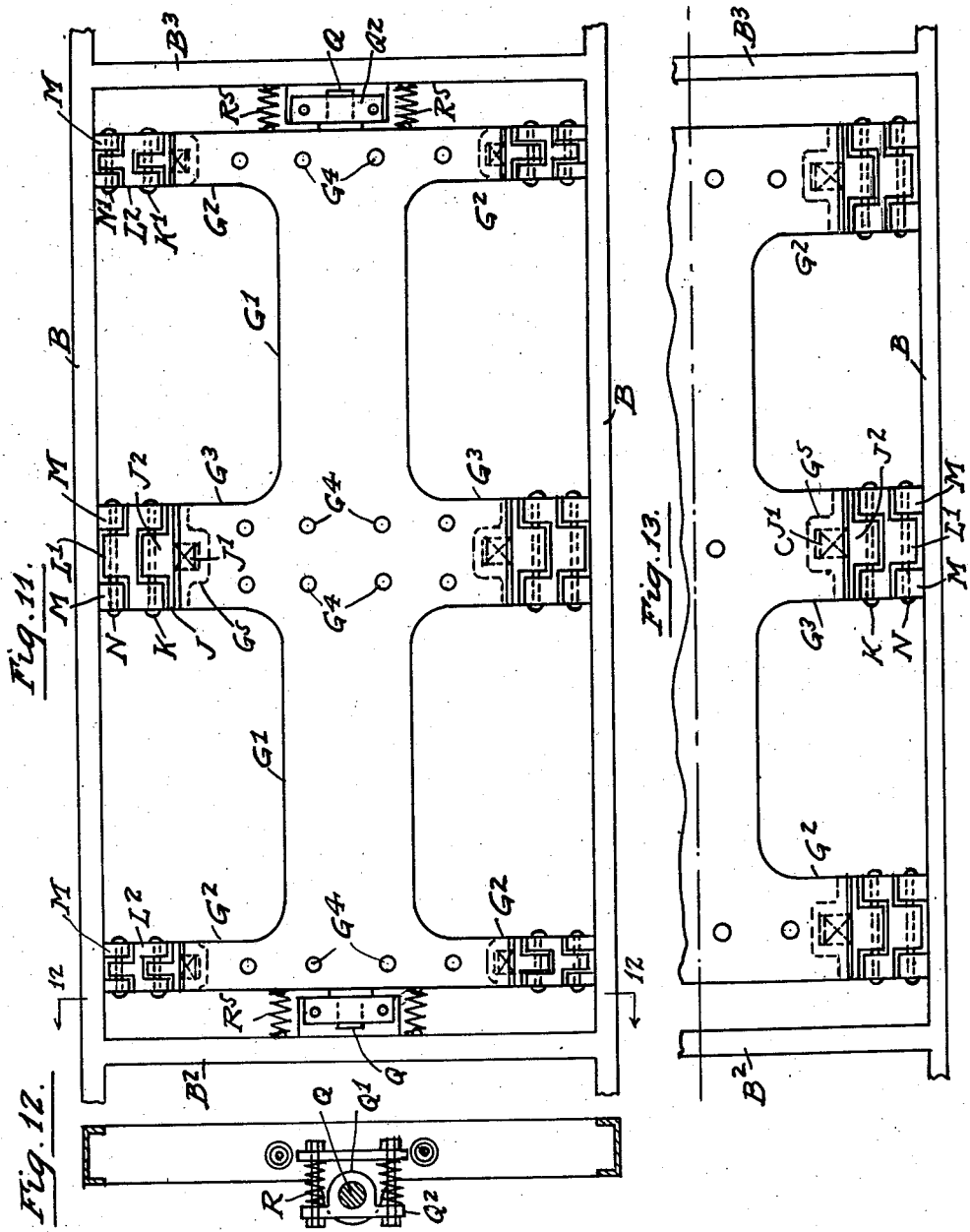

Jan. 3, 1939. A. B. BROLUSKA 2,142,173
AUTOMATIC EQUALIZING FLEXIBLE STABILIZER FOR SAFETY BODIES
Filed May 7, 1937     8 Sheets-Sheet 5
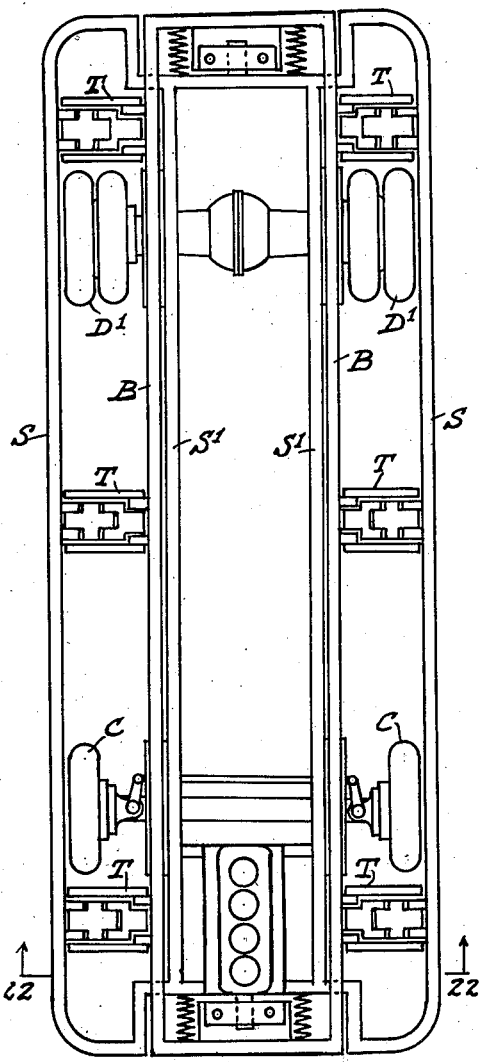
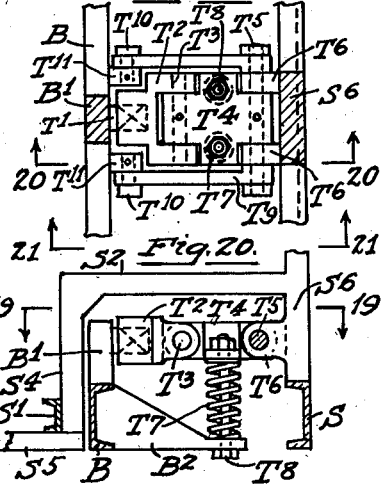
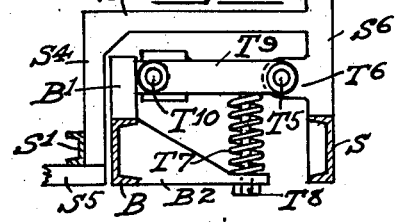
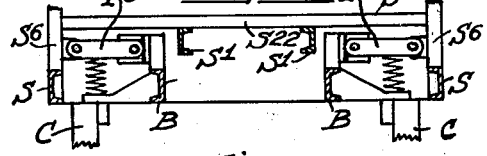
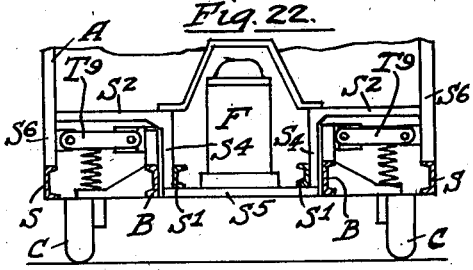
Inventor—
Amel B. Broluska Jan. 3, 1939.  A. B. BROLUSKA  2,142,173
AUTOMATIC EQUALIZING FLEXIBLE STABILIZER FOR SAFETY BODIES
Filed May 7, 1937  8 Sheets-Sheet 6
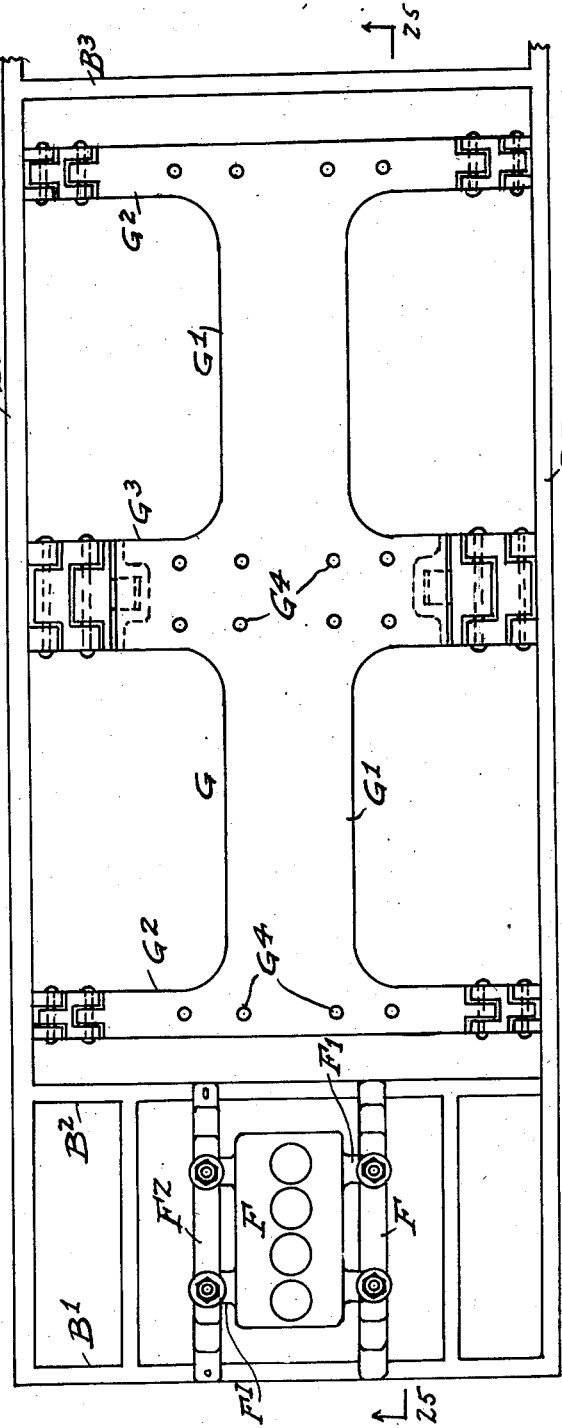
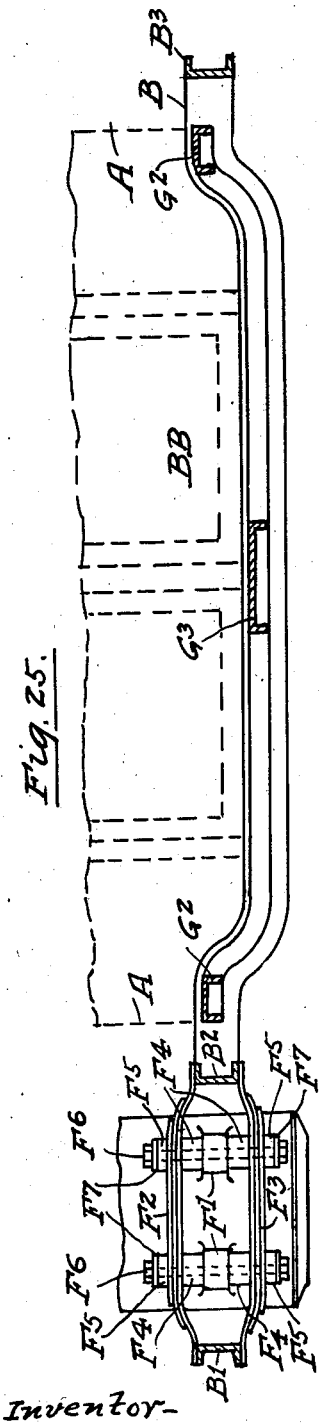
Inventor-
Amel B. Broluska

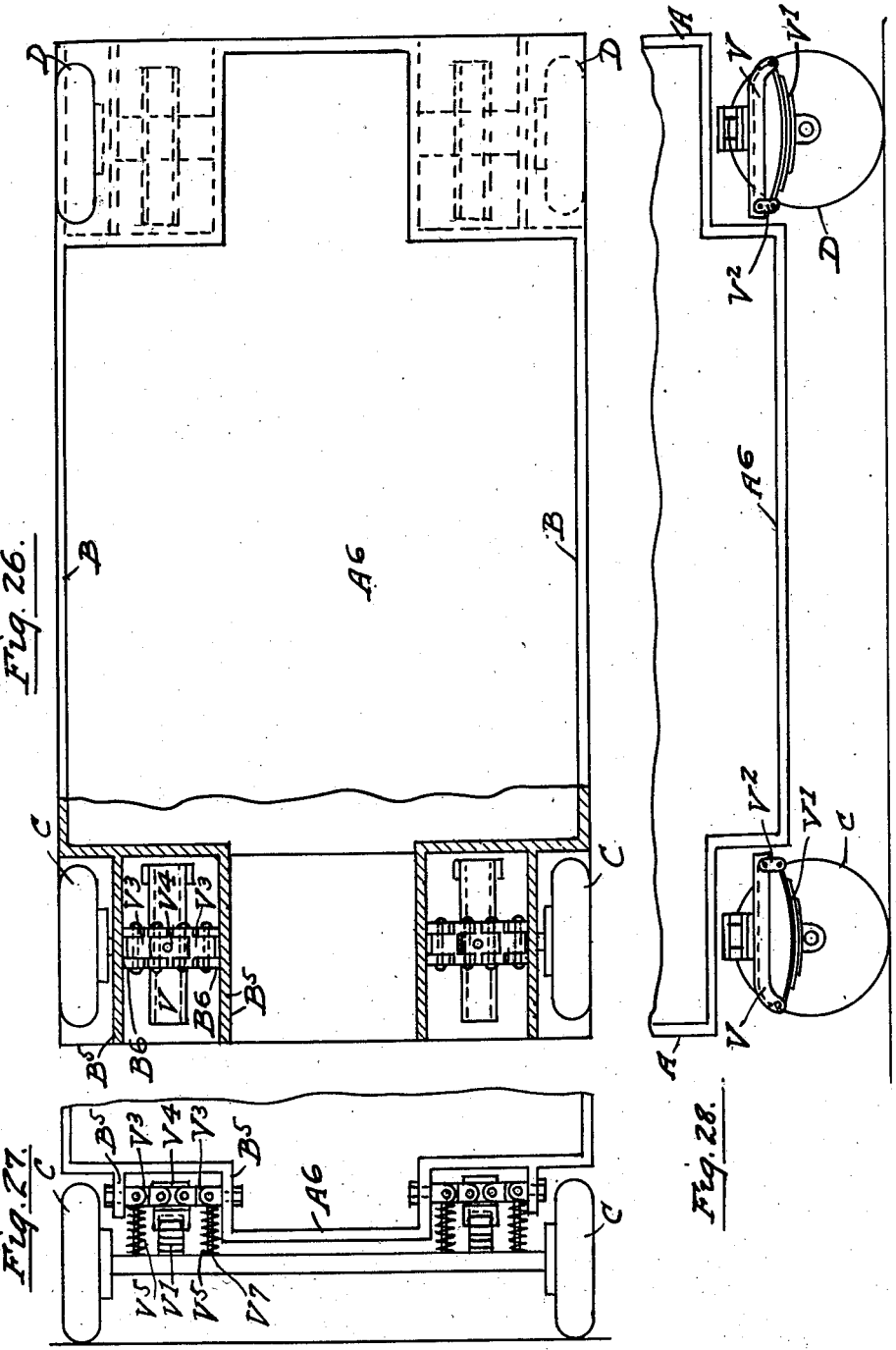

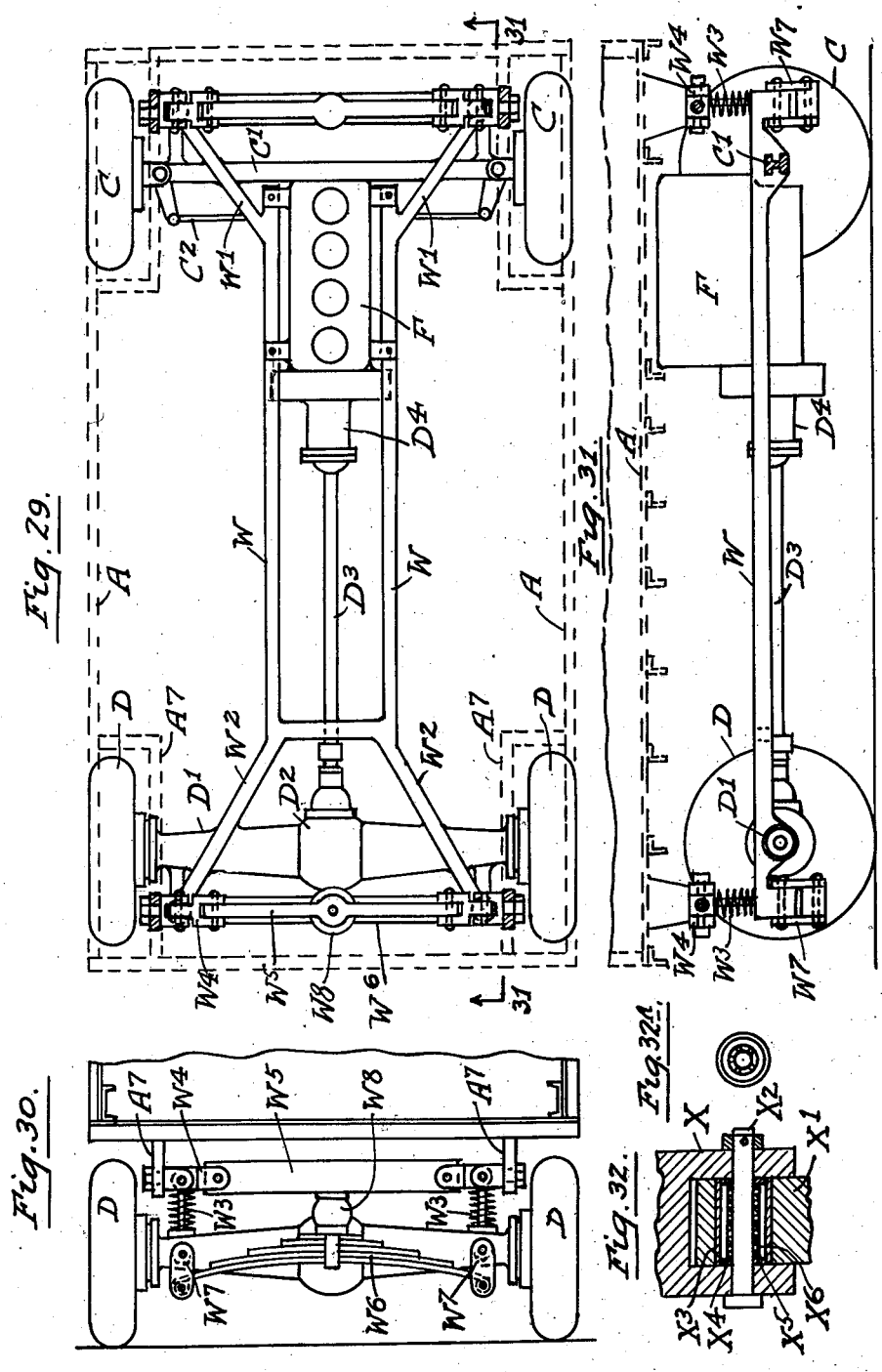

Patented Jan. 3, 1939

2,142,173

UNITED STATES PATENT OFFICE 2,142,173

AUTOMATIC EQUALIZING FLEXIBLE STABILIZER FOR SAFETY BODIES

Amel B. Broluska, Detroit, Mich.

Application May 7, 1937, Serial No. 141,205

7 Claims. (Cl. 280—106.5)

My invention relates to a flexible stabilizer system for automobiles, omnibuses, taxicabs and like vehicles, and its principal object is to provide a flexible, resiliently controlled connection between the chassis and the body of the vehicle whereby the latter is supported upon the chassis frame through flexible joints in such a manner that relative movement between the two is permitted about the longitudinal axis of the vehicle and also about its transverse axis after the manner of a "gimbal" or compass mounting, such relative movement being controlled by bumpers, springs, rubber cushions or by hydraulic or pneumatic shock-absorbing means, whereby the body is automatically stabilized and insulated from shocks, impacts and vibrations due to normal or rough road conditions. By this arrangement the chassis receives the road shocks and impacts which are transmitted to the body in a very much reduced amplitude, thus overcoming vibration, ensuring safety and comfort of the passengers and avoiding side sway, without the use of any of the so-called knee-action devices at present in use.

Another object of my invention is to provide means whereby the body and also the motor are flexibly suspended from the chassis, either with the motor and body acting as a unit or by separately suspending the motor and the body by independent connecting means.

Another object of my said invention is to provide a combination of main and auxiliary spring members in which the main members will support the lighter loads of a vehicle while the auxiliary members will come into action upon the imposition of heavier loads on the vehicle, thereby obtaining equal resiliency under both degrees of loading.

A further object of my said invention is to provide a suspension of the character described which is simple in construction and economical to manufacture by modern production methods.

With these and other objects in view, I will now describe a preferred embodiment of my invention as applied to passenger cars, on buses, and other vehicles, reference being had to the accompanying drawings in which—

Figure 1 is a longitudinal vertical section of a passenger vehicle having my invention applied thereto.

Figure 2 is a diagrammatical plan view illustrating the general layout of the chassis and associated parts.

Figure 3 is a vertical transverse section taken on line 3—3 of Figure 1.

Figure 4 is a fragmentary longitudinal section showing a modified packing means to be used between the vehicle body and the hood, the use of which will be hereinafter described.

Figure 5 is a fragmentary plan view corresponding to Figure 2 and drawn to an enlarged scale showing the details of my suspension system.

Figure 6 is a section taken on line 6—6 of Figure 5.

Figure 7 is a section taken on line 7—7 of Figure 5.

Figure 8 is a section taken on line 8—8 of Figure 5.

Figure 9 is a fragmentary section showing the construction of the main and auxiliary springs above referred to.

Figure 10 is diagram illustrating the method of mounting the springs which take up horizontal vibrations.

Figure 11 is a fragmentary plan view corresponding to Figure 5 showing a modified construction.

Figure 12 is a section taken on line 12—12 of Figure 11.

Figure 13 is a fragmentary half plan view corresponding to Figure 11 showing a still further modification in detail.

Figure 18 is a plan view of the chassis corresponding to Figure 15 but drawn to an enlarged scale and showing the suspension means more in detail.

Figure 19 is a fragmentary plan view drawn to an enlarged scale showing the details of my suspension shackle to be hereinafter described, and taken in section on line 19—19 of Figure 20.

Figure 20 is a vertical transverse section of the same taken on line 20—20 of Figure 19.

Figure 21 is a similar section taken on line 21—21 of Figure 19.

Figure 22 is a fragmentary transverse section taken on line 22—22 of Figure 18 illustrating certain details of the chassis construction, and Figure 23 is a similar section showing a modification.

Figure 24 is a fragmentary plan view showing a modified form of my invention wherein the body of the vehicle and the motor, respectively, are provided with separate and independent suspension means, and Figure 25 is a fragmentary vertical section of the same taken on line 25—25 of Figure 24.

Figure 26 is a plan view partly in section illustrating the application of my invention to a vehicle of the trailer type.

Figure 27 is a fragmentary end view of the same.

Figure 28 is a fragmentary side elevation of the same.

Figure 29 is a plan view of a vehicle chassis illustrating a modification of my invention to be hereinafter described.

Figure 30 is a fragmentary end view of the same.

Figure 31 is a side elevation of the same.

Figure 32 is a fragmentary section showing an improved construction of bearing to be employed in my suspension shackles, and Figure 32A is an end view of the bushing shown in Figure 32 and hereinafter fully described.

Like characters designate corresponding parts throughout the several views.

Figure 14:
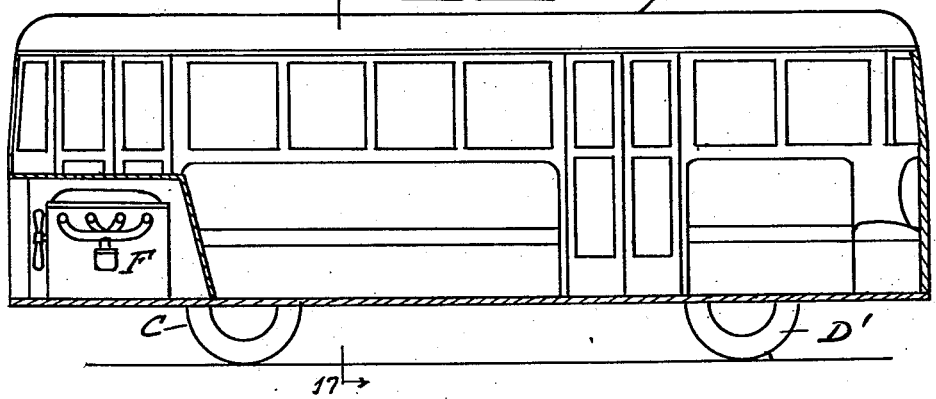
Figure 14 is a longitudinal vertical section of an omnibus having my invention applied thereto.

Referring now to Figures 1 to 10, inclusive, of the drawings, A is the body of the vehicle having the usual chassis frame B and front and rear wheels C and D, respectively, while E is the hood which serves to house the motor F and associated parts in the conventional manner. The motor, as will be seen from the diagrammatic plan view, Figure 2, is supported directly upon the cross members B1, B2 of the chassis frame, as usual. The body, however, is supported on an auxiliary frame G which is connected to the chassis frame by flexible joints and resilient cushioning means forming the subject of the present invention. The auxiliary frame G, as shown more in detail in Figures 5 to 8, inclusive, consists of a central longitudinal portion G1 having at each end a pair of laterally extending arms G2 and having at its center a pair of similar arms G3. In alignment with the several pairs of arms are holes G4 through which pass the bolts necessary for securing the body to the frame G. Upon the ends of the arms G3 are bosses G5 bored to receive journals J1 formed upon the ends of carrier blocks J, which blocks are also provided with horizontally extending lugs J2 bored to receive longitudinally disposed hinge pins K. Embracing the lugs J2 are shackles L through which the pins K pass, and integral with these shackles are lugs L1 which fit between brackets M upon the adjacent inner faces of the chassis frame members and are pivoted thereto by the longitudinal pins N. Thus, the frame G is capable of rocking in a fore-and-aft direction about the journals J1 and also of vertical movement at either side or at both sides simultaneously through the shackle connections just described.

In order to cushion the vertical movement of the body and its supporting frame G in a vertical direction, there are provided beneath each of the shackles L a pair of helical springs O, the upper ends of which bear against the undersides of the shackles, the said springs being held in position by bolts O1 while the lower ends are supported upon inwardly extending brackets P secured to the chassis frame. In order to further cushion the vertical movement of the frame G, there is provided at each end of the same the centrally disposed journals Q which are rotatably supported in pillow blocks Q1, the said blocks having laterally extending arms Q2 adapted to rest upon helical springs R, the lower ends of which are supported upon brackets R1 secured to the transverse members B2, B3 of the chassis frame. The springs R are secured in position by bolts R2, as shown in Figures 6 and 9. In some cases, in order to adapt these springs to meet different conditions of loading such as commonly occur in passenger automobiles, I provide within the springs R auxiliary springs R3 of shorter length than the springs R and so designed in proportion that while the main springs R carry the entire weight of the body when lightly loaded, the springs R3 will come into action so as to co-operate with the main springs when the vehicle is heavily loaded. In this manner, excessive vibration is prevented under all conditions of service.

The lateral shackle connections and the end connections just described are so constructed as to be capable of a moderate amount of play between their various parts, so that the frame G may, under stopping and starting conditions, move endwise relative to the frame, and in order to cushion such movement I provide between the arms G2 and the adjacent chassis members B2, B3, horizontally disposed helical springs R5, shown to enlarged scale in Figure 10, the said springs being retained in position by means of buttons or projections R6 which engage the ends of the same. Thus there will also be possible a small amount of lateral movement of the frame G relative to the chassis frame, and in order to prevent noise due to the impact between the two, I provide on the ends of the arms G2 rubber cushion members G5, G6 having stems G7 fitting within the openings in the ends of the arms.

It will be understood from the above description that the frame G, together with the body, is resiliently supported upon the chassis frame in an entirely flexible manner so that it is capable of moving about the longitudinal axis and about the transverse axis of the vehicle as well as directly up and down, the movement in all directions being cushioned by appropriate springs or other resilient means. Due to this flexible suspension, it will be apparent that a certain amount of relative movement will occur between the rigidly supported hood E and the adjacent cowl A1 upon the body, and in order to permit of such movement, I provide a space E1 between the hood and the cowl, as shown in Figure 1, such space being covered by means of hinged flaps E3 upon the hood which serves to prevent the entrance of rain, dust, and dirt into the interior of the hood. An alternative construction is shown in Figure 4 in which the hood and the cowl are provided with coacting flanges E2 and A2, respectively, there being interposed between them packings A3 of rubber, asbestos, or other suitable material, which will allow relative movement without permitting the entrance of water, dust and dirt.

The fragmentary plan view, Figure 11, illustrates a modified form of the general design shown in Figure 5. In this arrangement the auxiliary frame G is constructed as above described, having a central longitudinal portion G1 and having central and end arms extending laterally on either side. The central arms G3 are connected to the chassis frame by wide shackles of similar design and having the several parts similarly numbered as in Figure 5. The end arms G2, however, instead of having end buffers as previously described, are connected by shackles L2 of narrow width which are secured at one end by pins K1 to blocks J1 pivoted upon the ends of the arms and at the other end by pivots N1 to brackets M1 on the chassis frame. These end shackles are designed to allow considerable end play in the same manner as the central shackles, and endwise movement is cushioned by springs R5. The ends of the frame are also supported upon journals Q rotatably mounted in pillow blocks Q1 which are supported on helical springs R, all shown in Figure 12.

Beneath each of the end shackles L2 is provided a single vertically disposed end spring O which is supported by a narrow bracket P substantially as shown in Figure 7, and each of the central shackles is supported by a pair of similar springs as above described with reference to Figure 8 of the drawings. In the fragmentary plan view, Figure 13, is shown another modification of the auxiliary frame in which both the end arms G2 and also the central arms G3 are supported on wide shackles, each having a pair of cushioning springs and formed substantially as those illustrated upon the central arms in Figure 5.

Figure 15:
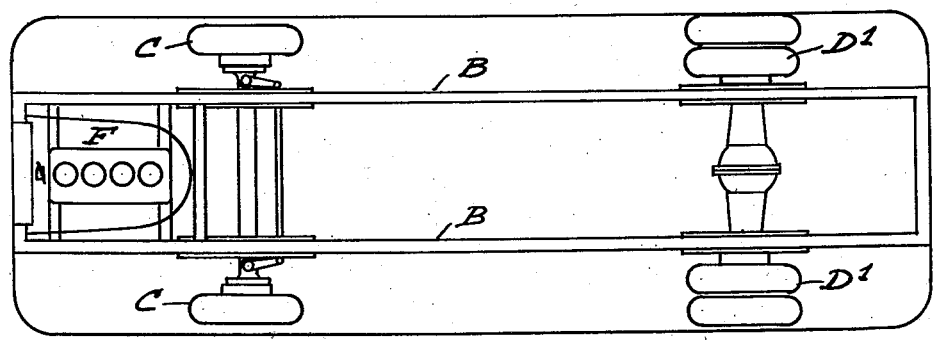
Figure 15 is a diagrammatical plan view of the chassis.
Figure 16:
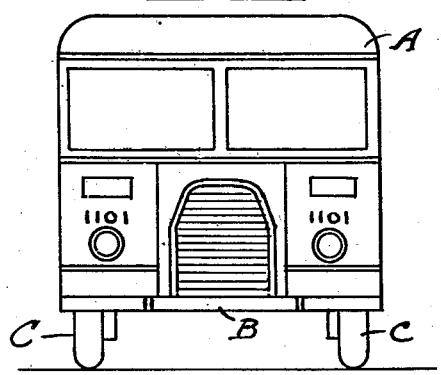
Figure 16 is a front view of the same.
Figure 17:
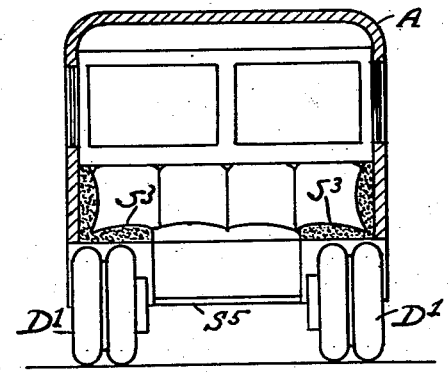
Figure 17 is a transverse section taken on line 17—17 of Figure 14.

When applying my invention to vehicles of the omnibus type, it is contemplated that, instead of securing the motor rigidly to the chassis frame, the motor and the body are together suspended upon a common auxiliary frame and this construction is illustrated in Figures 14 to 23, inclusive, of the drawings. Figures 14 to 17 inclusive indicate the general design, while Figures 18 to 23 inclusive show the details of construction. In this design A is the body of the vehicle provided with the usual front and rear doors and having the motor F located in an extension of the passenger space. The chassis frame B is carried upon a pair of single front wheels C and a pair of dual rear wheels D1 in the usual manner. The omnibus body is in general of the conventional construction and as shown in Figures 14 to 17, inclusive, no further description of the same being considered necessary. The flexible and resilient means for supporting the body, together with the motor and the auxiliary frame, upon the chassis frame presents, however, novel features which will now be described with particular reference to Figures 18 to 23 of the drawings.

In this modification, the body A is supported upon a sub-frame comprising outer members S and inner members S1, the two being connected rigidly together and supported upon the chassis frame B by means of three pairs of what I term compound shackle joints T to be hereinafter described. As shown more clearly in the transverse section, Figure 22, the inner and outer sub-frames S, S1 are connected together at various points by transverse members S2 which are of sufficient height above the chassis frame to provide clearance above the wheels and at the same time to afford convenient supports for the passenger seats S3 of the vehicle. The transverse members S2 are provided with downwardly extending hangers S4 which are connected by short transverse members S5 upon which latter the floor of the vehicle is supported as well as the motor and associated driving members. Thus, the body of the vehicle, together with the seats and flooring, and the motor are carried upon a self-contained unit as before stated.

The shackles T will now be described with particular reference to Figures 19, 20, and 21 which are drawn to an enlarged scale.

Upon vertical extensions B1 of the members B are fixed journals T1 and upon these journals are pivoted bifurcated members T2 in the free ends of which are pivot pins T3. To these pins are pivoted the inner ends of shackles T4, the outer ends of which are connected by pins T5 to lugs T6 formed integral with or secured to vertical extensions S6 upon the members S. Extended outwardly from the members B are brackets B2 and between these brackets and the shackles T4 are interposed pairs of helical springs T7 retained in position by bolts T8. Also pivoted upon the pins T5 are pairs of links T9, the inner ends of which are connected by studs T10 to lugs T11 formed integral with or secured to the members B. In this manner the frame members S, S1, which support the body of the vehicle as well as the motor, are connected to the main frame B by a system of dual linkage whereby increased safety of the connection is maintained and at the same time vertical movement of the body in relation to the chassis frame is efficiently controlled by means of the helical springs T7. In Figure 23 is shown a fragmentary transverse section corresponding to Figure 22 of the drawings, but in this case the floor of the vehicle extends straight across the body, being supported by a continuous transverse member S22 which takes the place of the transverse members S2 in Figure 22.

In some cases it may be found desirable, instead of supporting the body and the motor upon a common framework as in the modification just described, to mount the body and the motor each upon a separate framework having its own shackle connection with the chassis frame. Such an arrangement is illustrated in Figures 24 and 25 of the drawings, in which Figure 24 is a fragmentary plan view and Figure 25 is a section on line 25—25 of Figure 24. In this arrangement the body is supported upon an auxiliary frame G which is connected to the chassis frame B by three pairs of shackles of exactly similar construction to those shown in Figure 11, the central pair of shackles being of greater width than the two end pairs. The end journals Q, shown in Figure 11, as well as the longitudinal cushioning springs R5, are in this case omitted.

The motor F in this case is provided with two pairs of laterally extending lugs F1 through which it is suspended upon longitudinally extending upper and lower leaf springs F2, F3, the ends of which are supported upon the transverse members B1, B2 of the chassis frame. Between the lugs F1 and the supporting leaf springs are interposed rubber cushion members F4 which tend to produce a softer action of the springs, and exteriorly of these springs are other cushions of rubber F5 which are held in position in relation to the springs by means of bolts F6 which pass through all of the rubber cushions and through the springs, there being washers F7 between the heads and the nuts of the said bolts, whereby the pressures are properly distributed upon the adjacent rubber cushions.

In this modification it will be noted that the longitudinal members of the chassis frame are depressed, as indicated at BB in Figure 25, which makes a very convenient design in cases where head room is important.

In Figures 26 to 28 of the drawings is shown a modification of my invention which is adapted for use in the construction of trailers, mail trucks, or furniture vans in which the floor of the body is of the dropped or underslung type.

In this design the floor of the body A is provided with a dropped central portion indicated at A6 and in the end spaces adjacent the portion A6 are structural truck members V which are connected by the leaf springs V1 and appropriate shackles V2 to the front and rear axles which carry the front and rear wheels C and D, respectively, of the vehicle.

The truck members V are each positioned between longitudinal members B5 upon the chassis frame and are connected thereto by means of shackles V3, the outer ends of which are pivoted to lugs B6, while the inner ends are pivoted to members V4 which are solidly connected to the structural truck members V. Beneath the shackles V3 are helical compression springs V5, the lower ends of which are supported upon the respective front and rear axles of the vehicle as will be understood from the drawings. The springs V5 are maintained in position by bolts V7 in the manner well known in the art.

In Figures 29 to 32, inclusive, of the drawings is shown a modification of my invention in which the usual chassis frame is dispensed with, this design being specially adapted to the construction of light, high-speed automobiles of the highest grade. In this arrangement the body A, indicated in broken lines, is made of re-enforced steel construction in such manner as to be capable of resisting the racking and twisting strains to which it is normally subject.

In the drawings C1 is the front axle provided with the usual steering mechanism C2, and D1 is the rear axle having the centrally disposed differential gearing D2 and the propeller shaft D3 by which it is connected through transmission D4 to the motor F. Secured to or formed integral with the front and rear axles C1, D1 is a central frame W provided with diagonal extensions W1, W2 adjacent the said axles. The diagonal extensions are so arranged as to project outwardly beyond the axles to which they pertain, and upon the projecting ends are supported helical springs W3 adapted to resiliently support shackles W4, these shackles being pivoted at one end to vertical extensions A7 of the body and at the other ends to a central bridge member W5. The bridge member W5 is supported upon leaf springs W6 which are suspended by shackles W7 to the adjacent front and rear axles respectively, there being interposed between the members W5 and the springs W6 cushions W8 of rubber or other resilient material.

In Figure 32 of the drawings is shown in detail the preferred construction of the various shackle joints hereinbefore described. Such shackle joints consist essentially of a bifurcated member X between the sides of which is carried a central member X1, the two being secured together by means of a pivot pin such as indicated at X2. In order to ensure proper lubrication and long life in the various shackle members, I provide in the bore of the member X1 a tubular sleeve X3 having inwardly extending end flanges X4 and having also inner tubular members X5. The space between the members X3 and the members X5 is filled with grease or other lubricant which gradually escapes through openings X6 in the member X5 so as to afford continuous lubrication of the pin X2.

It will be observed from the foregoing description and by reference to the drawings that I have provided a construction embodying great superiority over the present designs and also one which will result in considerable reduction in cost in all the types of vehicles to which it can be applied.

While I have herein described and shown preferred embodiments of my improved vehicle, it will be understood by those skilled in the art to which the same relates that various changes and modifications in detail may be made without departing from the spirit of my invention as defined in the appended claims.

What I claim and desire to secure by Letters Patent of the United States is:

1. In an automobile, the combination, with a chassis frame of an auxiliary frame adapted to support a body, shackles intermediate said chassis frame and auxiliary frame and connected thereto by longitudinally disposed hinge pins, brackets secured to said chassis frame and extending beneath said shackles, and resilient means interposed between said shackles and said brackets.

2. In an automobile, the combination, with a chassis frame of an auxiliary frame adapted to support a body, shackles intermediate said chassis frame and auxiliary frame and connected thereto by longitudinally disposed hinge pins, brackets secured to said chassis frame and extending beneath said shackles, and helical coil springs interposed between said shackles and said brackets.

3. In an automobile, the combination, with a chassis frame, of an auxiliary frame adapted to support a body, shackles intermediate said chassis frame and auxiliary frame and connected thereto by longitudinally disposed hinge pins, brackets secured to said chassis frame and extending beneath said shackles, helical coil springs interposed between said shackles and said brackets, longitudinal journals centrally disposed upon the ends of said auxiliary frame, bearings upon said chassis frame adapted to rotatably and slidably support said journals, and resilient means interposed between said bearings and said chassis frame.

4. In an automobile, the combination, with a chassis frame of an auxiliary frame adapted to support a body, shackles intermediate said chassis frame and auxiliary frame and connected thereto by longitudinally disposed hinge pins, brackets secured to said chassis frame and extending beneath said shackles, helical coil springs interposed between said shackles and said brackets, longitudinal journals centrally disposed upon the ends of said auxiliary frame, bearings upon said chassis frame adapted to rotatably and slidably support said journals, and helical coil springs interposed between said bearings and said chassis frame.

5. In an automobile, the combination, with a chassis frame of an auxiliary frame adapted to support a body, shackles intermediate said chassis frame and auxiliary frame and connected thereto by longitudinally disposed hinge pins, brackets secured to said chassis frame and extending beneath said shackles, helical coil springs interposed between said shackles and said brackets, longitudinal journals centrally disposed upon the ends of said auxiliary frame, bearings upon said chassis frame adapted to rotatably and slidably support said journals, vertical coil springs interposed between said bearings and said chassis frame, and horizontal coil springs interposed between said auxiliary frame and said chassis frame.

6. In an automobile, the combination, with a chassis frame of an auxiliary frame adapted to support a body, transverse bearings in said auxiliary frame, members rotatably supported in said bearings, shackles intermediate said members and said chassis frame and connected thereto by longitudinally disposed hinge pins, brackets secured to said chassis frame and extending beneath said shackles, and helical coil springs interposed between said shackles and said brackets.

7. In an automobile, the combination, with a chassis frame of an auxiliary frame adapted to support a body, transverse bearings in said auxiliary frame, members rotatably and slidably supported in said bearings, shackles intermediate said members and said chassis frame and connected thereto by longitudinally disposed hinge pins, brackets secured to said chassis frame and extending beneath said shackles, helical coil springs interposed between said shackles and said brackets, and links connected to said members and said chassis frame and adapted to limit endwise movement of said journals in said bearings.

AMEL B. BROLUSKA.